(12) United States Patent
Sohn et al.

(10) Patent No.: US 9,806,749 B2
(45) Date of Patent: Oct. 31, 2017

(54) METHOD AND APPARATUS FOR OPERATING A TRAY MECHANISM

(71) Applicant: Google Technology Holdings LLC, Mountain View, CA (US)

(72) Inventors: Byoungkwan Sohn, Buffalo Grove, IL (US); Jun Hee Lee, Vernon Hills, IL (US); Young-Seok Alex Sung, Evanston, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 542 days.

(21) Appl. No.: 14/247,278

(22) Filed: Apr. 8, 2014

(65) Prior Publication Data

US 2015/0189774 A1 Jul. 2, 2015

Related U.S. Application Data

(60) Provisional application No. 61/921,560, filed on Dec. 30, 2013.

(51) Int. Cl.
*H04B 1/3816* (2015.01)
*G06K 13/08* (2006.01)

(52) U.S. Cl.
CPC ....... *H04B 1/3816* (2013.01); *G06K 13/0831* (2013.01)

(58) Field of Classification Search
CPC ............... G06K 13/0831; G06K 13/08; G06K 13/0806; G06K 13/0862; G06K 13/0812; G06K 13/0825; G06F 1/184; G06F 1/181; G06F 1/187; H04B 1/3818; H04B 1/3816; G03G 15/6505; G03G 2215/00383; G03G 2215/00434
(Continued)

(56) References Cited

U.S. PATENT DOCUMENTS 5,011,420 A 4/1991 Sakamoto
5,389,001 A 2/1995 Broschard, III et al.
(Continued)

FOREIGN PATENT DOCUMENTS

EP 1074936 A1 2/2001

OTHER PUBLICATIONS

Merriam-Webster Dictionary, "Definition of Centerline," https://www.merriam-webster.com/dictionary/centerline (last visited Mar. 7, 2017).*

*Primary Examiner* — Theodore Adamos
(74) *Attorney, Agent, or Firm* — Fish & Richardson P.C.

(57) ABSTRACT

A tray mechanism for a device housing includes a tray bed having a planar surface with first and second opposing sides that form a boundary around the planar surface, wherein the first opposing sides include a front side and a back side, wherein the front side is configured with dimensions for closing an opening of a cavity within the device housing, and wherein the second opposing sides are configured for a slideable attachment within the cavity of the device housing. The tray mechanism further includes a lever positioned on the planar surface of the tray bed and a hinge mechanism that pivotally connects the lever to the planar surface of the tray bed. A method for operating the tray mechanism includes a convex side of the lever rolling against the device housing as the lever rotates to eject the tray bed pivotally connected to lever from the device housing.

20 Claims, 5 Drawing Sheets

(58) Field of Classification Search
USPC ........ 439/159, 157, 152, 153, 160; 361/754, 361/725, 801; 403/322.4
See application file for complete search history.

(56) References Cited

U.S. PATENT DOCUMENTS

| | | | |
|---|---|---|---|
| 5,597,316 A | 1/1997 | David et al. | |
| 5,790,373 A * | 8/1998 | Kim | G06F 1/184 360/137 |
| 5,793,614 A * | 8/1998 | Tollbom | H05K 7/1409 361/725 |
| 5,889,649 A * | 3/1999 | Nabetani | G06K 7/0082 361/679.32 |
| 6,030,236 A * | 2/2000 | Matsuura | H01R 13/6275 439/157 |
| 6,210,188 B1 * | 4/2001 | Chang | G06K 13/08 439/159 |
| 6,254,085 B1 * | 7/2001 | Kang | B65H 1/04 271/171 |
| 6,315,583 B1 * | 11/2001 | Nishioka | G06K 13/0856 439/131 |
| 6,361,339 B1 * | 3/2002 | Zhang | H01R 13/6335 439/160 |
| 7,144,007 B2 * | 12/2006 | Kim | H04N 1/00708 271/171 |
| 8,337,223 B2 | 12/2012 | Gao et al. | |
| 8,460,018 B2 | 6/2013 | Henry et al. | |
| 8,495,666 B1 * | 7/2013 | Fan | G11B 17/0405 720/646 |
| 8,937,811 B2 * | 1/2015 | Wang | H05K 7/1461 312/223.1 |
| 2009/0267677 A1 * | 10/2009 | Myers | G06K 13/08 327/356 |
| 2012/0195013 A1 * | 8/2012 | Trzaskos | G06K 13/0831 361/754 |
| 2012/0220146 A1 * | 8/2012 | Yokoyama | G06K 13/0806 439/159 |
| 2013/0044452 A1 * | 2/2013 | Tang | H04B 1/3816 361/807 |
| 2013/0063910 A1 * | 3/2013 | Chao | G06F 1/1656 361/754 |
| 2013/0250525 A1 * | 9/2013 | Wang | H05K 7/1461 361/737 |
| 2013/0267106 A1 * | 10/2013 | Jenks | G11B 17/00 439/160 |
| 2014/0177144 A1 * | 6/2014 | Wu | G06F 1/1613 361/679.01 |
| 2014/0362548 A1 * | 12/2014 | Liu | G06F 1/16 361/754 |
| 2015/0022981 A1 * | 1/2015 | Tan | G06K 7/0021 361/756 |
| 2015/0072549 A1 * | 3/2015 | Okoshi | H01R 13/633 439/160 |
| 2015/0171552 A1 * | 6/2015 | Lei | G06K 13/0831 439/153 |
| 2016/0149340 A1 * | 5/2016 | Chang | G06K 13/08 439/38 |

* cited by examiner

METHOD AND APPARATUS FOR OPERATING A TRAY MECHANISM

RELATED APPLICATION

The present application is related to and claims benefit under 35 U.S.C. §119(e) of the U.S. Provisional Patent Application Ser. No. 61/921,560, filed Dec. 30, 2013, titled "Method and Apparatus for Operating a Tray Mechanism", which is commonly owned with this application by Motorola Mobility, Inc., and the entire content of which is incorporated herein by reference.

FIELD OF THE DISCLOSURE

The present disclosure relates generally to a method and apparatus for operating a tray mechanism and more particularly to using a lever for ejecting a tray from a device.

BACKGROUND

Many manufactured devices are configured to accept removable elements as part of their operational design. This is particularly true of electronic devices, which often accept removable memory modules, program modules, and/or subscriber identification modules, for example. Designing devices with the capability of accepting removable modules prolongs the service life of the devices. When a need arises, a user can simply swap out a module rather than invest in a new device.

Removable modules are typically seated completely within devices so as not to present protrusions than can be caught or broken. Flush-fitting modules also provide a streamlined look. Trays are often used with modules of a certain shape of form, such as for cards. The trays facilitate the insertion and removal of the cards and keep the cards properly aligned to mate with connectors within the devices.

Fully inserted modules cannot be griped for removal, and levers within the devices frequently provide the means by which the modules are ejected. The use of levers to eject modules, however, has drawbacks. A lever positioned within a device takes up internal volume that adds to a form factor of the device. Further, a mating surface against which the lever can act leads to an increased size of a carriage used as vehicles for a removable module.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. In addition, the description and drawings do not necessarily require the order presented. It will be further appreciated that certain actions and/or steps may be described or depicted in a particular order of occurrence while those skilled in the art will understand that such specificity with respect to sequence is not actually required.

The apparatus and method components have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and apparatus for operating a tray mechanism. More particularly, the present disclosure relates to the use of a lever with a rolling fulcrum for opening a tray bed positioned within a cavity of a device housing, such as the housing of a mobile or portable electronic device. In accordance with the teachings herein, a tray mechanism for a device housing includes a tray bed having a planar surface with first and second opposing sides that form a boundary around the planar surface, wherein the first opposing sides include a front side and a back side, wherein the front side is configured with dimensions for closing an opening of a cavity within the device housing, wherein the tray bed is configured for a slideable attachment within the cavity of the device housing. The tray mechanism further includes a lever positioned on the planar surface of the tray bed and a hinge mechanism that pivotally connects the lever to the planar surface of the tray bed.

Also in accordance with the teachings herein is a method for operating a tray mechanism located within a cavity of a device housing. The method includes receiving contact to a lever that is pivotally connected to a tray bed of the tray mechanism using a hinge mechanism, wherein the contact is received through an opening in the tray mechanism. The method further includes rotating the lever about the hinge mechanism in response to the contact such that a curved side of the lever rolls along a portion of the device housing that extends into the cavity such that a force is exerted from the device housing to the lever and from the lever to the hinge mechanism and from the hinge mechanism to the tray bed to eject the tray bed from the cavity of the device housing.

Further in accordance with the teachings herein is a method for manufacturing a tray mechanism for a device housing. The method includes positioning a lever on a surface of a tray bed, which also includes first and second opposing sides that form a boundary around the surface, wherein the first opposing sides include a front side and a back side, wherein the front side is configured with dimensions for closing an opening of a cavity within the device housing, wherein the tray bed is configured for a slideable attachment. The method also includes securing the lever using a hinge mechanism that pivotally connects the lever to the surface of the tray bed, thereby forming a tray mechanism, and slideably attaching the tray mechanism within the cavity of the device housing.

Figure 1A:
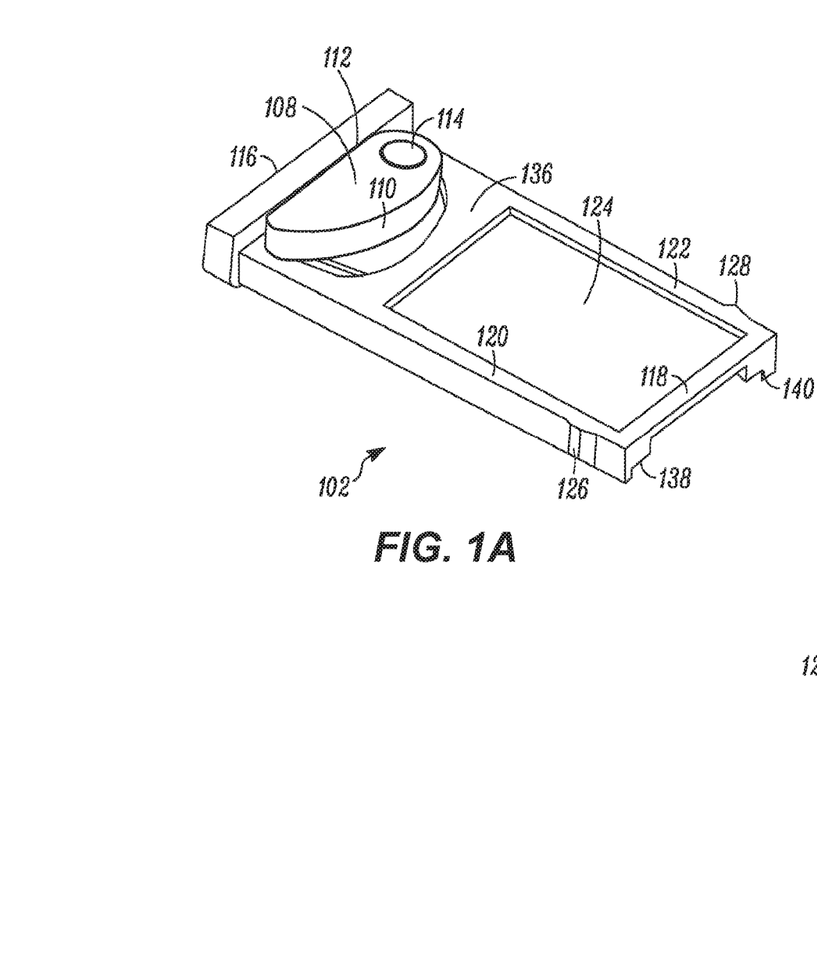
FIGS. 1A and 1B are diagrams showing two perspective views of a tray mechanism in accordance with some embodiments of the present teachings.
Figure 1B:
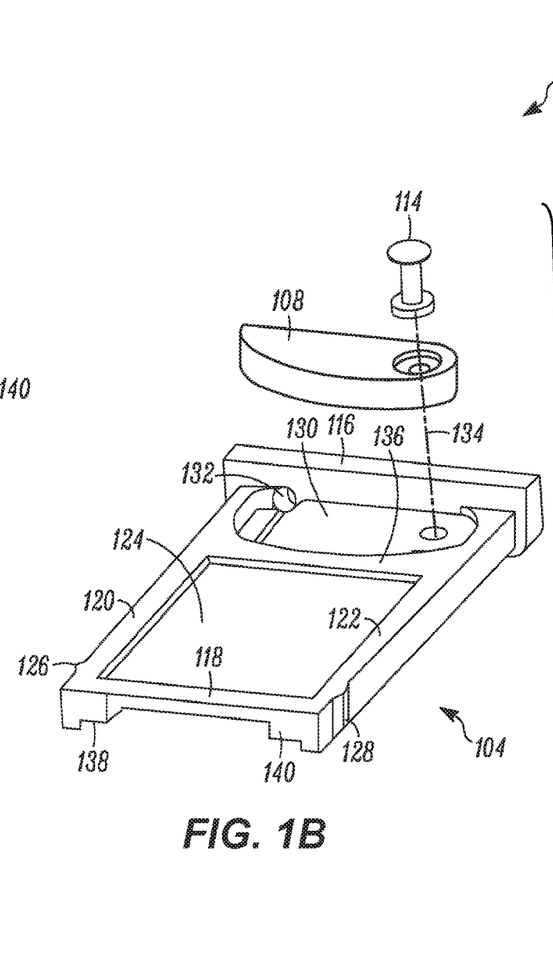

Referring now to the drawings, and in particular FIGS. 1A and 1B, a tray mechanism for a tray bed that is slideably removable from a device housing is shown at 102 and 104 in two perspective views included in a diagram 100. Specifically, the tray mechanism as shown at 100 includes a tray bed 136, a lever 108 having a front side 112 and a back side 110, and a hinge mechanism 114 that pivotally connects the lever 108 to the tray bed 136. The tray bed 136 additionally includes a front side 116, a back side 118, a left side 120, a right side 122, a left retention bump 126, a right retention bump 128, a first depression 130, a second depression 124, a first rail 138, a second rail 140, and a through-hole 132. The front 116 and back 118 sides of the tray bed 136 are also referred to herein as the first opposing sides, and left 120 and right 122 sides of the tray bed 136 are also referred to herein as the second opposing sides.

The diagram 100 also shows an axis 134, which is perpendicular to the planar surface of the tray bed 136, along which the hinge mechanism 114 pivotally connects the lever 108 to the tray bed 136. A lever, as used herein, is a rigid object that is a separate piece from the tray bed but is attached directly to the tray bed in accordance with the present teachings to facilitate ejecting the tray bed from a device housing. The hinge mechanism 114 is a pin that is fixed to the tray bed 136 and about which the lever 108 can rotate. In different embodiments, the hinge mechanism 114 has different shapes. For example, the hinge mechanism 114 can be of a cylindrical or a conical shape.

For some embodiments, the tray bed 136 is configured with the first depression 130 and the second depression 124, wherein the first depression 130 is located adjacent to the front side 116 of the tray bed 136 as shown at 104. The lever 108 is positioned within the first depression 130 of the tray bed 136 as shown at 102. The first depression 130 also has an area that exceeds the area of a side of the lever 108 placed against the first depression 130. This gives the lever 108 room to rotate within the first depression 130 while keeping the lever 108 properly aligned with the tray bed 136. In this embodiment, the height of the lever 108 above the first depression 130 does not exceed the height of the front side 116 of the tray bed 136, which allows the lever 108 to clear an opening within a device housing into which the tray bed 136 is inserted and from which the tray bed 136 is ejected. In an additional embodiment, the second depression 124 of the tray bed 136 is framed by the left 120, right 122, and back 118 sides of the tray bed 136 and configured with dimensions to hold a subscriber identification module (SIM).

As defined herein, a device is any apparatus having a housing with a cavity into which and from which a slideable tray bed can be inserted and withdrawn. Devices consistent with the teachings herein include, but are not limited to: smartphones; phablets; tablets; personal digital assistants (PDAs); portable media players (e.g., MP3 players); electronic book readers; personal navigation devices (e.g., global-positioning-system (GPS) receivers); and wearable electronic devices, such as devices worn with a wristband or armband. A smartphone, for instance, has a slideably removable tray bed that holds a SIM card. Within the housing or shell of the smartphone is a cavity into which the tray bed is inserted and from which the tray bed 136 is ejected. As the tray bed closes, a front face of the tray bed closes an opening of the cavity into which the tray bed is inserted. For example, the front face of the tray bed has a contour or shape that matches the contour or shape of the opening of the cavity so that when the tray bed is fully inserted, the front side of the tray bed follows the contour or shape of the device housing.

For an embodiment, the tray bed 136 is slideably attached within the cavity of a device housing by the left 138 and right 140 rails formed on the underside of the left 120 and right 122 sides of the tray bed 136, respectively. The rails 138, 140 mate with adjacent structures on the device housing within the cavity of the device to allow the tray bed 136 to slide in and out of the device cavity on its rails 138, 140.

FIGS. 2A and 2B and FIGS. 6A and 6B are diagrams 200 showing top views 272, 276 and side views 274, 278 of the tray mechanism 100 with the tray bed 136 in both open and closed positions. More specifically, the views 272 and 274 show the tray bed 136 in a closed position from the top and from the side, respectively, while the views 276 and 278 show the tray bed 136 in an open position from the top and from the side, respectively. In addition to the elements of the tray mechanism shown at 100, FIG. 2 shows a tool 260, an initial fulcrum point 242 for the lever 108, another fulcrum point 252 for the lever 108, a connector 262, a left retention clip 264, a cavity 266, and a portion of a device housing 240 extending into the cavity 266. The views 272 and 276 of the diagram 200 also show a centerline 252 for the lever 108 and the tray bed 136.

Figure 2A:
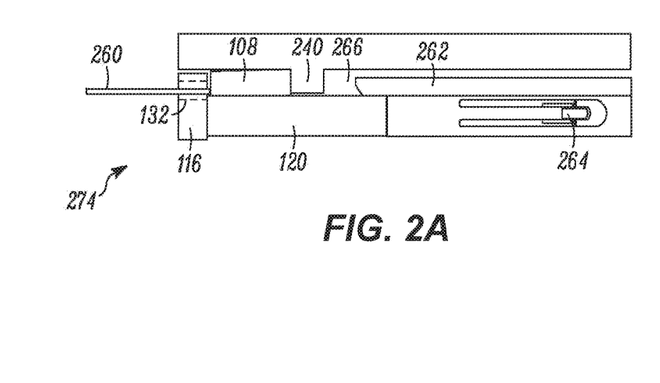
FIGS. 2A and 2B are diagrams showing top views and side views of a tray mechanism for a tray bed in both open and closed positions in accordance with some embodiments of the present teachings.
Figure 2B:
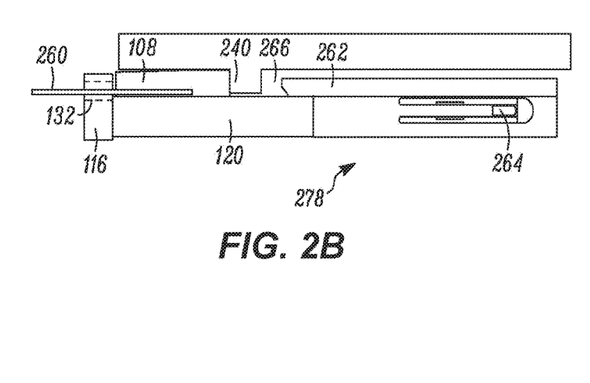

The centerline 252 represents two overlapping centerlines, one for the tray bed 136 and one for the lever 108. In other embodiments, the centerlines for the tray bed 136 and the lever 108 are not collinear. The centerline 252 divides the lateral distance (i.e., the left-to-right distance) of the tray bed 136 and lever 108 into halves. The distance from the left edge of the lever 108 and tray bed 136 to the center line 252 is the same as the distance from the right edge of the lever 108 and tray bed 136 to the centerline 252.

The cavity 266 is a space or hollow formed within a housing or shell of the device into which the tray bed 136 is inserted and from which the tray bed 136 is removed. The portion of the device housing 240 is a portion of the device housing that extends or protrudes into the cavity 266. It is the portion of the device housing 240 against which the lever 108 pushes to open the tray bed 136.

Where the back side 110 of lever 108 contacts the device housing 240 when the tray bed 136 is fully inserted into the device cavity 266 in its closed position, as shown at 272 and 274, is the initial fulcrum point 242. If the back side 110 of lever 108 does not contact the device housing 240 in the closed position, the initial fulcrum point 242 is the first point of contact between the back side 110 of lever 108 and the device housing 240 as the tool 260 pushes the lever 108 toward the device housing 240 while the tray bed 136 is in its closed position. It is not until after the lever 108 contacts the device housing 240 that the device housing 240 can push back on the lever 108 so the lever 108 can push open the tray bed 136. As the tray bed 136 opens, the point of contact between the back side 110 of lever 108 and the device housing 240 advances from the initial fulcrum point 242 to another fulcrum point 252 as shown at 276. For an embodiment, the back side of the lever 108 has convex curvature, which allows the initial fulcrum point 242 to advance to the fulcrum point 252 as the lever 108 rolls on its convex curvature against the device housing 240. In other embodiments, the back side 110 of the lever 108 can be of any shape, which can include different curvatures, lines, and/or angles, such that the lever 108 can push open the tray bed 136 with the application of a force to the lever 108.

The tool 260 is an implement that is grasped at one end and is narrow enough on its opposite end to pass through the through-hole 132 in the front side 116 of the tray bed 136 and push on the lever 108. As shown at 272 and 274, the tray bed 136 is positioned in the cavity 266 such that the front side 116 of the tray bed 136 closes an opening of the cavity 266. In this closed position, a first portion of the front side 112 of the lever 108 to the left of the centerline 252 at least partially covers the through-hole 132.

The connector 262 is an element of the device that physically and/or electronically mates with a removable element that is carried by the tray bed 136 as the tray bed 136 is inserted into the cavity 266 within the device. For a particular embodiment, the second depression 124 of the tray bed 136 is configured to carry a SIM card (not shown) and positioned to allow the SIM card to mate with the connector 262 when the tray bed 136 is closed. With the SIM card placed in the second depression 124, the SIM card can slide under the connector 262 as shown in view 274. The SIM card moves with the tray bed 136 as the tray bed is opened and closed, while the connector 262 is fixed with respect to the device housing 240. When the tray bed 136 is in its closed position, contacts on the connector 262 mate with contacts on the SIM card to establish an electrical connection between the SIM card and the connector 262, and therefore between the SIM card and the device of which the connector 262 is a part.

In another embodiment, the second depression 124 is formed on the underside of the tray bed 136 and the SIM card as placed in the second depression is fastened or otherwise held in place so the SIM card does not fall from the tray bed 136 as the tray bed 136 is inserted into the device cavity 266. In this configuration, the connector 262 is located under the tray bed 136 to mate with the SIM card when the tray bed 136 is closed.

With the tray bed 136 closed, the left retaining clip 264 shown in views 274 and 278, which has an inward-facing bend, "snaps" over the left retention bump 126. Not visible in the views 274 and 278 is also a right retaining clip that snaps over the right retention bump 128. The retention bumps 126, 128 together with the retaining clips 264 function as a retention mechanism that prevents the tray bed 136 from opening unintentionally as a result of quick movements or a position in which a device with the tray bed 136 is held. In another embodiment, retention depressions replace the retention bumps 126, 128.

Figure 3:
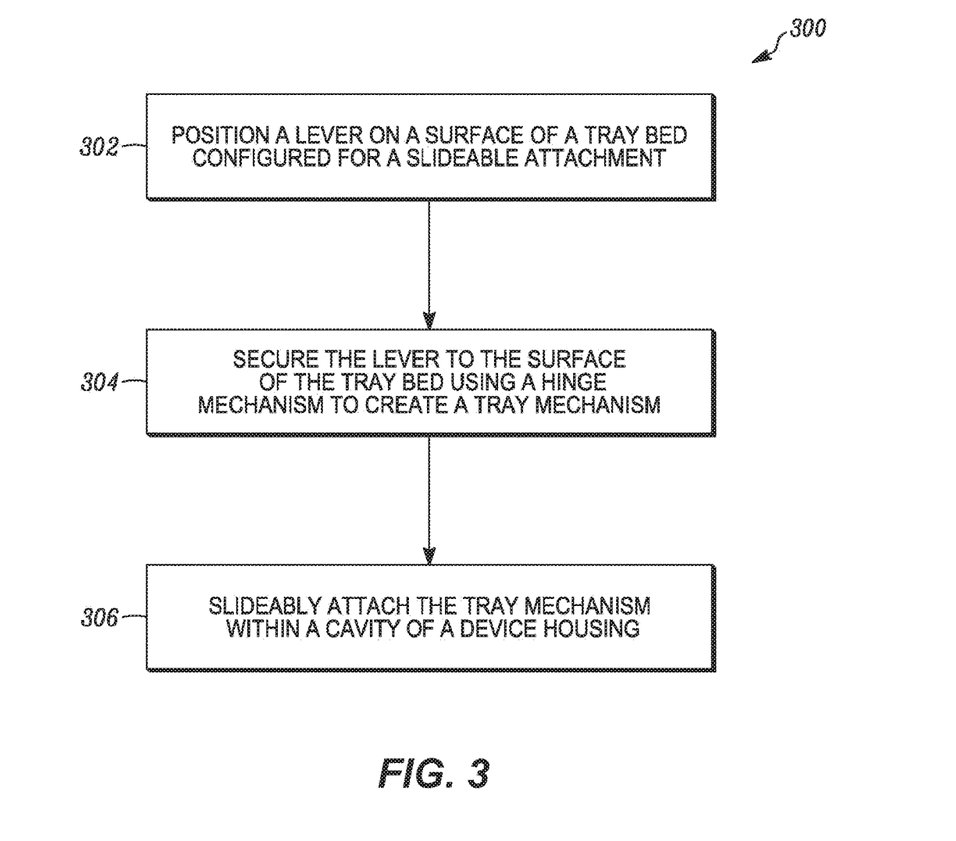
FIG. 3 is a logical flow diagram illustrating a method of manufacturing for a tray mechanism in accordance with some embodiments of the present teachings.

FIG. 3 is a logical flow diagram illustrating a method 300 of manufacturing for the tray mechanism shown at 100 in accordance with some embodiments of the present teachings. During manufacturing the lever 108 is positioned 302 on a surface of the tray bed 136 configured for a slideable attachment. The lever 108 is secured 304 to the tray bed 136 using the hinge mechanism 114 to create the tray mechanism 100. The tray mechanism 100 is also slideably attached 306 within the cavity 266 of the device housing. The rails integrated into the second opposing sides 120, 122 of the tray bed 136 as shown in FIG. 1, for example, are used to slideably attach the tray mechanism 100 within the cavity 266 of the device housing. For one embodiment, the tray mechanism 100 is manufactured together with the device for which the tray mechanism 100 is used. In another embodiment, the tray mechanism is manufactured separately from the device for which the tray mechanism 100 is used.

Figure 4:
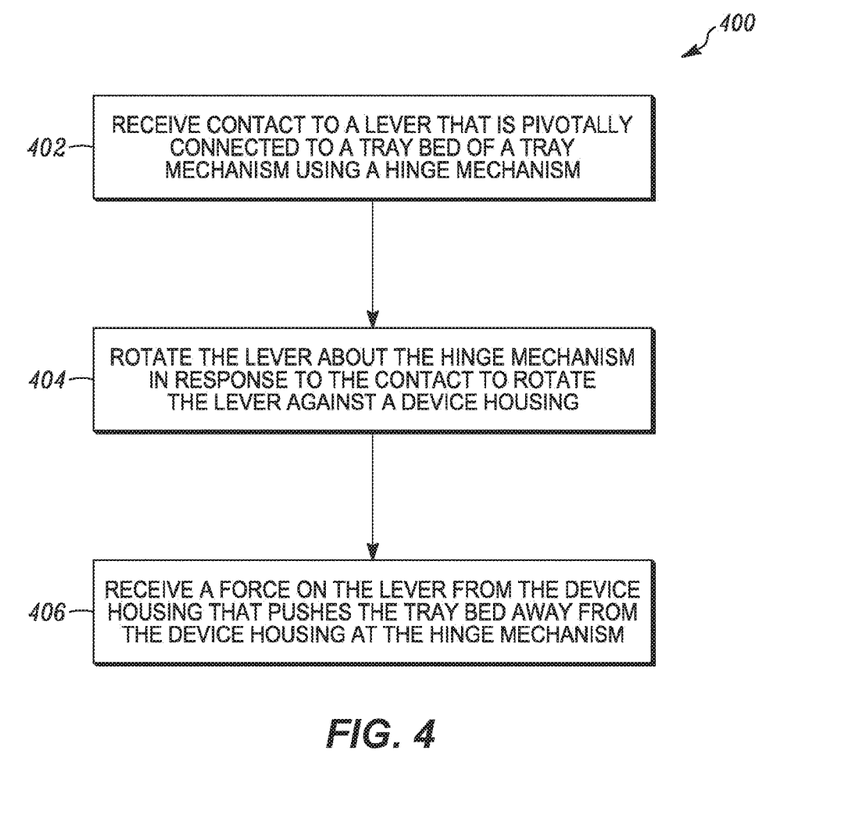
FIG. 4 is a logical flow diagram illustrating a method of operation for a tray mechanism in accordance with some embodiments of the present teachings.

FIG. 4 is a logical flow diagram illustrating a method 400 of operation for the tray mechanism 100 in accordance with some embodiments of the present teachings. The tray mechanism 100 receives 402 contact to the lever 108 that is pivotally connected to the tray bed 136 using the hinge mechanism 114. The contact comes from the tool 260 that is inserted through the through-hole 132. In response to the tool 260 pushing on the lever 108, the lever 108 rotates 404 about the hinge mechanism 114. As the lever 108 rotates, it rolls along the device housing 240 from the initial fulcrum point 242 to the fulcrum point 252 as shown at 272 and 276. The lever 108 rolls, it receives 406 a force from the device housing 240 which pushes back on the lever 108 at its point of contact with the lever 108. The force on the lever 108 from the device housing 240 is transmitted by the lever 108 to the hinge mechanism 114, and the hinge mechanism, in turn, pushes the tray bed 136 away from the device housing 240.

Figure 5:
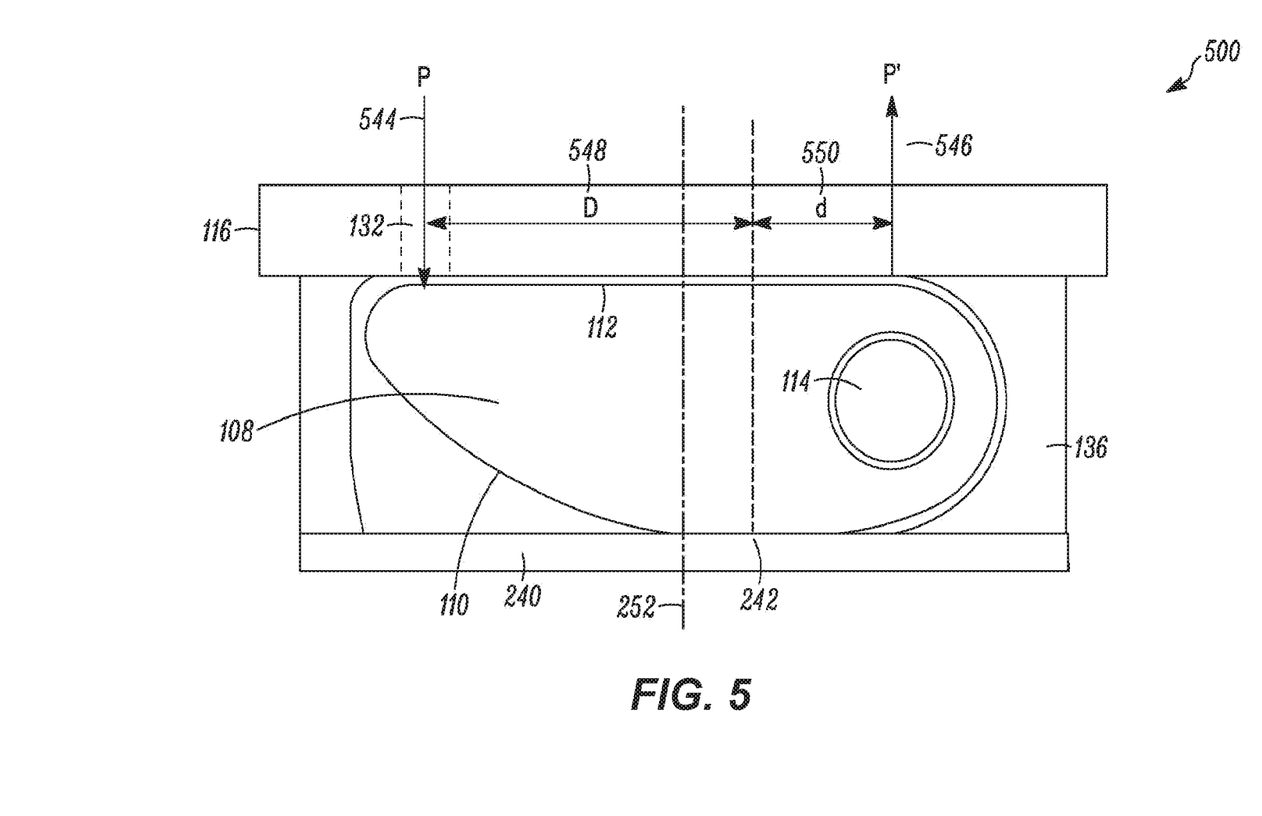
FIG. 5 is a diagram showing a top view of a portion of a tray mechanism in accordance with some embodiments of the present teachings.
Figure 6A:
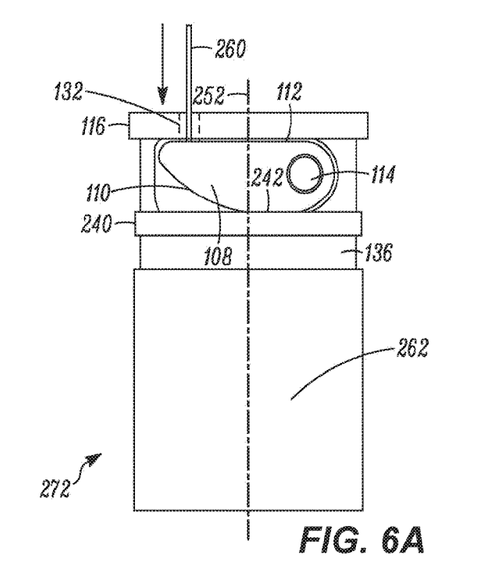
FIGS. 6A and 6B are diagrams showing top views of a tray mechanism for a tray bed in both open and closed positions in accordance with some embodiments of the present teachings.
Figure 6B:
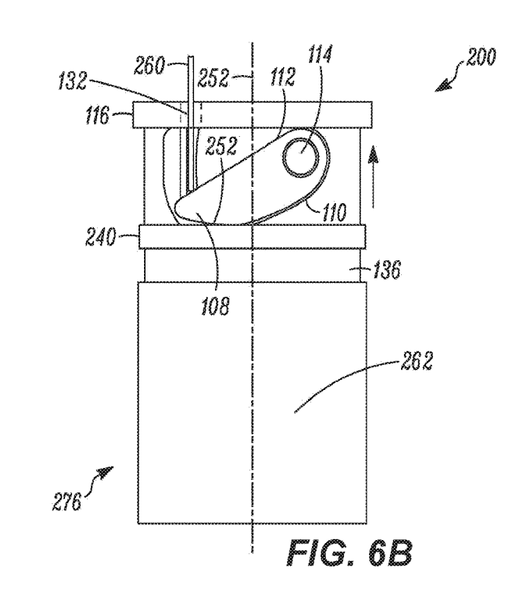

FIG. 5 shows a top view 500 of a portion of the tray mechanism 100 that illustrates the operation of the tray mechanism 100 in terms of forces that are applied to the lever 108. Indicated at 500 is: the lever 108, with its front and back sides indicated at 112 and 110, respectively; the hinge mechanism 114; and a front portion of the tray bed 136 that includes the front side 116 of the tray bed 136 and the through-hole 132. Also indicated at 500 is: the initial fulcrum point 242; a first force P 544 at a first distance D 548 from the initial fulcrum point 242; a second force P' 546 at a second distance d 550 from the initial fulcrum point 242; the centerline 252 for the tray bed 136 and lever 108; and the portion of a device housing 240 for the device holding the tray mechanism 100, wherein the housing portion 240 extends into the cavity 266 within the device.

As shown at 500, the tray bed 136 is in a closed position wherein the front side 112 of the lever 108 is positioned adjacent to the front side 116 of the tray bed 136. In an embodiment, the front side 112 of the lever 108 conforms to a shape of the front side 116 of the tray bed 136, which, in turn, conforms to a shape of the device housing into which the tray bed 136 is inserted. In the immediate case, the front side 112 of the lever 108 is planar to conform to the front side 116 of the tray bed 136, which is also planar. In other embodiments, the front side 112 of the lever 108 can be partially or fully non-planar and can include angles and/or curvature which can be concave and/or convex. For the embodiment shown in the view 500, the front side 112 of the lever 108 is planar, and the back side 110 of the lever 108 has convex curvature. This however, is only one of many embodiments for which the front 112 and back 110 sides of the lever 108 can be of different shapes.

The convex curvature of the backside 110 of the lever 108 in the embodiment illustrated at 500 forms a "belly" which contacts the device housing 240. The point of contact acts as a fulcrum for the lever. The lever 108 receives the first force P 544 on one side of the fulcrum point 242 (or 252 after the lever 108 has moved) and exerts the second force P' 546 on the other side of the fulcrum point 242 (or 252). While the contact between the lever 108 and the device housing 240 is referred to herein as a "point" of contact or a fulcrum "point," it may instead be a line of contact, if the back side 110 of the lever 108 is straight across its width such that it contacts the device housing 240 at more than one point in a line along its width, or an area of contact, if the lever 108 is constructed from a semi-rigid material that deforms under pressure.

For a particular embodiment, the initial fulcrum point 242 is closer to the hinge mechanism 114 than it is to the portion of the front side 112 of the lever 108 that at least partially covers the through-hole 132 (i.e., the portion of the lever 108 the tool 260 contacts) when the tray bed 136 is in its closed position within the cavity 266 of the device housing. Also, the axis 134 along which the hinge mechanism 114 attaches to the tray bed 136 is located off-center with respect to the centerline 252 of the lever 108 and the tray bed 136, as shown at 500. Specifically, the axis 134 is located on a second side of the centerline 252, also referred to herein as the right side, while the through-hole 132 in the front side 116 of the tray bed 136 is located on a first side of the centerline 252, also referred to herein as the left side. The portion of the front side 112 of the lever 108 that at least partially covers the through-hole 132 is therefore also a portion of the left side of the lever 108.

For an embodiment, the first force P 544 is applied to the left side of the lever 108 at the location where the front side 112 of the lever 108 at least partially covers the through-hole 132 and where the tool 260 inserted through the through-hole 132 pushes on the lever 108. As the first force P 544 is applied to the lever 108, the left side of the lever 108 rotates down (inward) away from the front side 116 of the tray bed 136. The first point at which the convex back side 110 of the lever 108 contacts the device housing 240 after the first force P 544 is applied is the initial fulcrum point 242. In one embodiment, the back side 110 of the lever 108 is already in contact with the device housing 240 while the tray 100 is in the closed position and before the first force P 544 is applied. For another embodiment in which the back side 110 of the lever 108 is not in contact with the device housing 240 when the tray bed 136 is in a closed position, the application of the first force P 544 rotates the lever 208 into the device housing 240 to make first contact at the initial fulcrum point 242.

As the lever 108, in response to the first force P 544, pushes on the device housing 240, the device housing 240 pushes back on the lever 108 in accordance with Newton's third law of motion. The force of the device housing 240 pushing back on the lever 108 is transmitted by the lever 108 (the lever 108 being constructed of a rigid or semi-rigid material) to the hinge mechanism 114, which is connected to the tray bed 136. As the lever 108 rotates around the hinge mechanism 114, the lever 108 imparts the linear second force P' 546 on the hinge mechanism 114 that pushes open the tray bed 136 the hinge mechanism 114 is connected to.

For the tray bed 136 to open, the first force P 544 applied to the lever 108 is of sufficient magnitude to cause the second force P' 546 to overcome a retention force that initially holds the tray bed 136 closed, such as a clip or spring retention force. To aid in opening the tray bed 136, the lever 108 provides a mechanical advantage. In the closed position while the tray bed 136 is being held in place by the retention force, the first force P 544 acts at a point located a first distance D 548 from the initial fulcrum point 242, as shown in the diagram 500, while the second force P' 546 acts at a point located a second distance d 550 from the initial fulcrum point 242. The distance D 548 being greater than the distance d 550 serves to multiply the first force P 544 by the ratio of the distance D 548 to the distance d 550, yielding a second force P' 546 that exceeds the applied first force P 544. This makes it easier for a user of the device to overcome the retention force and open the tray bed 136. It also allows for the use of a smaller tool 266 to generate the force P 544, which, in turn, allows for a smaller through-hole 132. For some embodiments, the initial fulcrum point 242 is closer to the portion of the lever 108 at least partially covering the through-hole 132 than to the hinge mechanism 114 (i.e., the distance D 548 is less than the distance d 550).

As the retention force is overcome and the tray bed 136 opens, the lever 108 is configured through its pivotal connection with the hinge mechanism 114 to roll along the convex curvature of its back side 110 against the portion of the device housing 240 that extends into the cavity 266 of the device. The left side of the lever 108 is pushed away from the front side 116 of the tray bed 136 by the first force P 544, and the fulcrum point (the point of contact between the back side 110 of the lever 108 and the device housing 240) moves from the initial fulcrum point 242 to the left as the back side 110 of the lever 108 rolls to the left along the device housing 240. As the first force P 544 continues to push down (inward) on the lever 108 to the left of the moving fulcrum point, the lever 108 continues to push up (outward) on the hinge mechanism 114 to the right of the moving fulcrum point as indicated by the second force 546, which continues to push open the tray bed 136. When the tray bed 136 has been pushed a sufficient distance from the device housing, a user can grip the tray bed 136 to fully remove it from the device housing.

Referring again to the diagram 200, after the lever 108 has rolled a distance along the device housing 240, the fulcrum point 252 has moved from the right of the centerline 252, as shown in view 272, to the point 252 on the left of the centerline 252, as shown in view 276. As the lever 108 rolls, it continues to push the tray bed 136 open (as indicated by the outward-facing arrow in view 276) by pushing on the hinge mechanism 114 that is attached to the tray bed 136. When the tray bed is extended a sufficient distance from the opening of the device cavity 266 for the user to grip the tray bed 136, the user can stop applying force to the tool 260 passed through the through-hole 132.

Because the lever 108 is attached to the tray bed 136, it is ejected with the tray bed 136 from the cavity 266 in the device housing. For this reason, the lever 108 fits completely behind the front side 116 of the tray bed 136. Views 274 and 278 show that the lever 108 does not exceed the front side 116 of the tray bed 136 in height, and views 272 and 276 show that the lever 108 does not exceed the front side 116 of the tray bed 136 in width. Locating the lever 108 behind the front side 116 of the tray bed 136 in the space between the front side 116 of the tray bed 136 and the portion of the device housing 240 that extends down into the cavity 266 of the device housing makes efficient use of volume and allows for a smaller form factor for the device. While the lever 108 is shorter than many traditional levers used for opening tray beds, the convex curvature on the back side 110 of the lever 108 as shown at 272 and 276 allows for a mechanical advantage such that the force the lever applies to the hinge mechanism 114 exceeds the force the tool 260 applies to the lever 108 as the tray bed 136 begins to open.

Traditional levers are connected to a housing of a traditional device and therefore do not eject with a tray bed from the traditional device. This often requires the front side of the tray bed to be extended to provide the traditional lever with a surface to push against. The larger front face, in turn, results in a larger cavity within the traditional device. The traditional lever being connected to the traditional device housing and extending beyond the front face of the tray bed also results in a larger form factor for the traditional device. These are both disadvantages that are overcome by the present teachings.

In a further embodiment, the lever 108 is constructed using a plastic material. Plastic does not interfere with the radiation patterns of wireless communication devices the way metal does and allows for the placement of a cavity within a wireless communication device closer to the antenna of the device. As form factors for such devices become smaller, the use of materials that do not interfere with radiation patterns becomes a more important consideration. In alternate embodiments, however, the lever 108 may be constructed from any rigid or semi-rigid material.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A tray mechanism for a device housing, the tray mechanism comprising:
   a tray bed comprising:
   (i) a front side dimensioned to close an opening of a cavity of the device housing,
   (ii) a back side opposite the front side, and
   (iii) a module depression located between the front side and the back side, the module depression configured to receive a removable module and defined by a planar surface that defines a bottom surface of the module depression and is bound by at least a first side, a second side, and a third side;
   a hinge mechanism; and
   a lever located between the front side of the tray bed and the module depression, the lever pivotally attached to the tray by the hinge mechanism,
   wherein the lever is rotatable about a pivot axis that is spaced from and perpendicular to the planar surface of the module depression and the lever is configured to remain behind the front side during movement of the lever.

2. The tray mechanism of claim 1, wherein the lever is a separate component from the tray bed.

3. The tray mechanism of claim 2, wherein the hinge mechanism comprises a pin extending at least partially through the lever and the tray bed.

4. The tray mechanism of claim 1, wherein the lever has a planar front side and a curved back side such that the front side of the lever and the back side of the lever are asymmetrical.

5. The tray mechanism of claim 4, wherein the curved back side of the lever defines a rolling fulcrum.

6. The tray mechanism of claim 1, wherein the lever comprises a first end fixedly positioned relative to the pivot axis.

7. The tray mechanism of claim 6, wherein the lever is rotatable away from the front side of the tray bed about the pivot axis between a first configuration in which the first end of the lever contacts the front side of the tray bed and a second configuration in which the first end of the lever is spaced from the front side of the tray bed.

8. The tray mechanism of claim 6, wherein the lever is rotatable away from the front side of the tray bed about the pivot axis between a first configuration in which the first end of the lever contacts the front side of the tray bed and a second configuration in which the first end of the lever is between the pivot axis and the back side of the tray bed.

9. The tray mechanism of claim 1, wherein the pivot axis is located off-center to a centerline of the lever and also off-center to a centerline of the tray bed extending between the front side and the back side.

10. The tray mechanism of claim 9, wherein the front side of the tray bed comprises a through-hole.

11. The tray mechanism of claim 10, wherein the tray bed comprises a first region on a first side of both the centerline of the lever and the centerline of the tray bed, a second region on a second side of both the centerline of the lever and the centerline of the tray bed, and a third region between the centerline of the lever and the centerline of the tray bed, and
the through-hole is located in the first region and the pivot axis is located in the second region.

12. The tray mechanism of claim 11, wherein the centerline of the lever and the centerline of the tray bed are parallel to one another.

13. The tray mechanism of claim 10, wherein in a first configuration a planar front side of the lever is positioned against the front side of the tray bed such that the lever covers the through-hole.

14. The tray mechanism of claim 1, wherein:
the tray bed comprises a lever depression spaced from the module depression, the lever at least partially within the lever depression.

15. An electronic device, comprising:
a device housing defining a cavity;
a tray mechanism slideably positionable within the cavity of the device housing, the tray mechanism comprising:
 a tray bed comprising:
  (i) a front side dimensioned to close an opening of the cavity of the device housing,
  (ii) a back side opposite the front side, and
  (iii) a module depression located between the front side and the back side, the module depression configured to receive a removable module and defined by a planar surface that defines a bottom surface of the module depression and is bound by at least a first side, a second side, and a third side;
 a hinge mechanism; and
 a lever located between the front side of the tray bed and the module depression, the lever pivotally attached to the tray by the hinge mechanism;
wherein the lever is rotatable about a pivot axis that is spaced from and perpendicular to the planar surface of the module depression and the lever is configured to remain behind the front side during movement of the lever.

16. The electronic device of claim 15, wherein the lever comprises a first end that is fixedly positioned relative to the pivot axis and that is rotatable about the pivot axis away from the front side of the tray bed and towards engagement with a portion of the device housing to slideably remove the tray mechanism from the cavity.

17. The electronic device of claim 16, wherein the lever comprises a curved surface defining a rolling fulcrum configured to roll against the portion of the device housing as the first end rotates about the pivot axis.

18. The electronic device of claim 17, wherein the rolling lever is configured to roll against the portion of the device housing between:
 (a) a first fulcrum point where the rolling fulcrum initially contacts the portion of the device housing, and
 (b) a second fulcrum point such that force is transmitted by the lever to push the tray bed away from the device housing.

19. A method for manufacturing a tray mechanism for a device housing, the method comprising:
pivotally attaching a lever on a surface of a tray bed, wherein the tray bed comprises:
 (i) a front side dimensioned for closing an opening of a cavity of the device housing,
 (ii) a back side opposite the front side, and
 (iii) a module depression located between the front side and the back side, the module depression configured to receive a removable module and defined by a planar surface that defines a bottom surface of the module depression and is bound by at least a first side, a second side, and a third side,
wherein the lever is rotatable about a pivot axis that is spaced from and perpendicular to the planar surface of the module depression and the lever is configured to remain behind the front side during movement of the lever.

20. The method of claim 19, wherein pivotally attaching the lever comprises securing the lever to the tray bed by a hinge mechanism, the hinge mechanism comprising a pin extending at least partially through the lever and the tray bed.

* * * * *